United States Patent [19]
DeVolpi

[11] Patent Number: 6,087,925
[45] Date of Patent: *Jul. 11, 2000

[54] JOYSTICK POINTING DEVICE

[76] Inventor: Dean DeVolpi, 295 N. Front St., Unit B, Rio Vista, Calif. 94571

[*] Notice: This patent is subject to a terminal disclaimer.

[21] Appl. No.: 09/071,262

[22] Filed: May 1, 1998

Related U.S. Application Data

[63] Continuation-in-part of application No. 08/944,282, Oct. 6, 1997, Pat. No. 5,949,325, which is a continuation-in-part of application No. 08/496,433, Jun. 29, 1995, Pat. No. 5,675,309.

[51] Int. Cl.[7] .................................................. H01C 10/06
[52] U.S. Cl. .................................. 338/92; 338/47; 463/38
[58] Field of Search .............................. 338/68, 69, 73, 338/93, 47, 152, 128, 118, 196, 92, 166, 167, 13; 340/407.2; 364/190; 200/516, 292, 6 A; 74/471 XY; 273/148 R, 148 B; 463/38

[56] References Cited

U.S. PATENT DOCUMENTS 5,675,309  10/1997  DeVolpi ..................................... 338/68

*Primary Examiner*—Karl Easthom
*Attorney, Agent, or Firm*—Patents + TMS, P.C.

[57] ABSTRACT

A curved disc joystick or pad with improved performance, reliability and durability can be used as a cursor pointing device for computers, remote controls, video games, consumer electronics, industrial controllers, automotive and other applications. A conductive spring or sheath connects to a conductive curved rubber transducer which can be deflected to make contact with conductors on a printed circuit board, providing electrical outputs to a microprocessor or other device. A ribbed locking extension may be added to automate the assembly process. In addition, a collar may be provided to produce a controllable product, both in terms of manufacturing and performance.

1 Claim, 7 Drawing Sheets

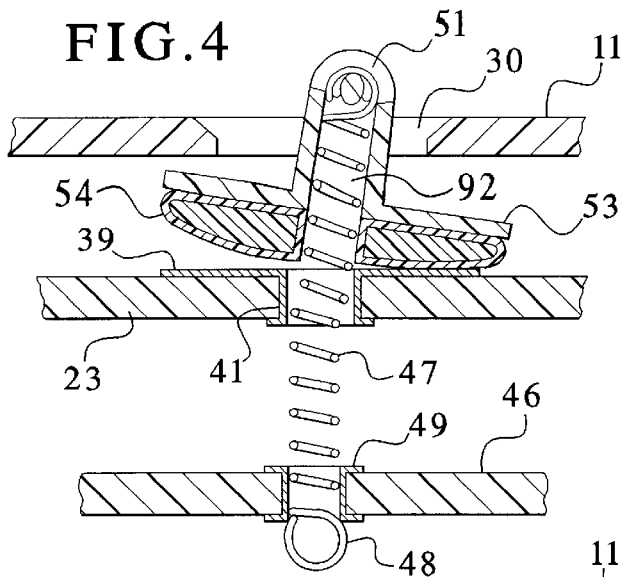
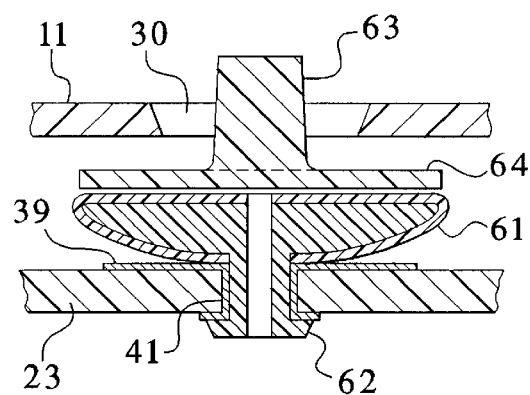
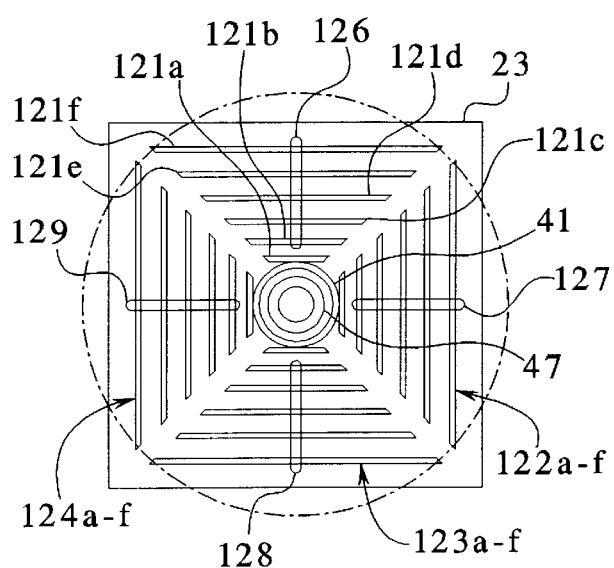
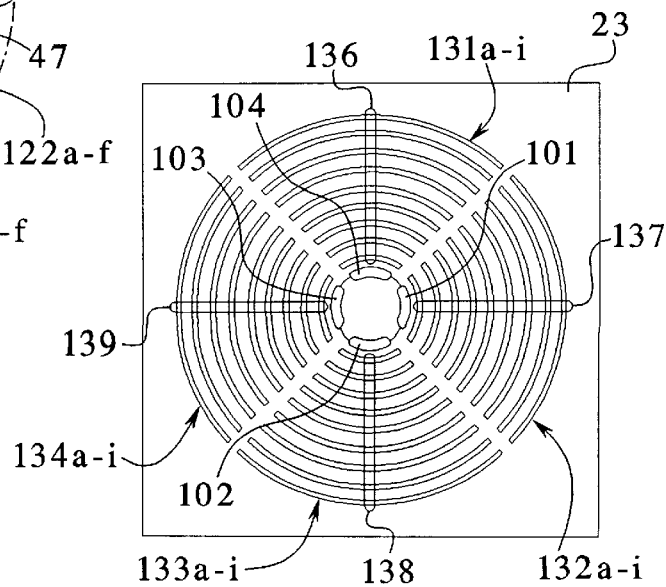

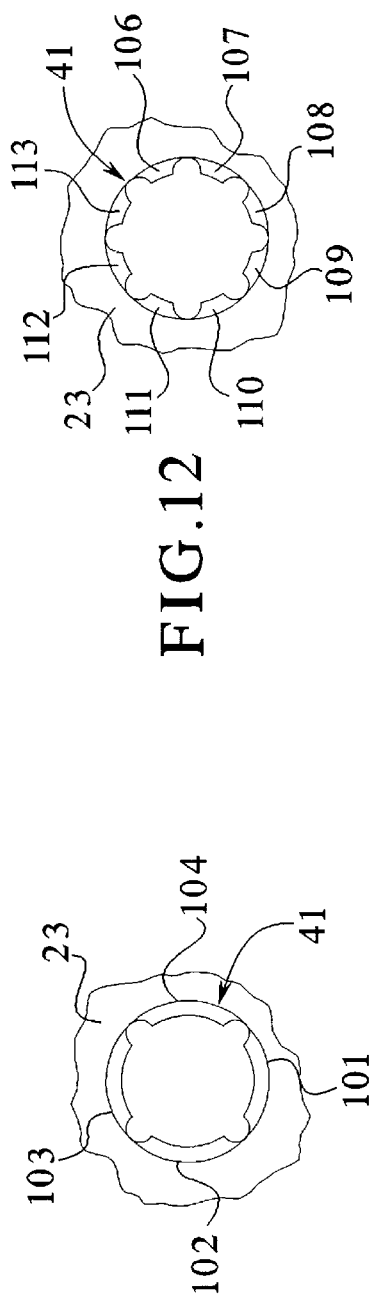
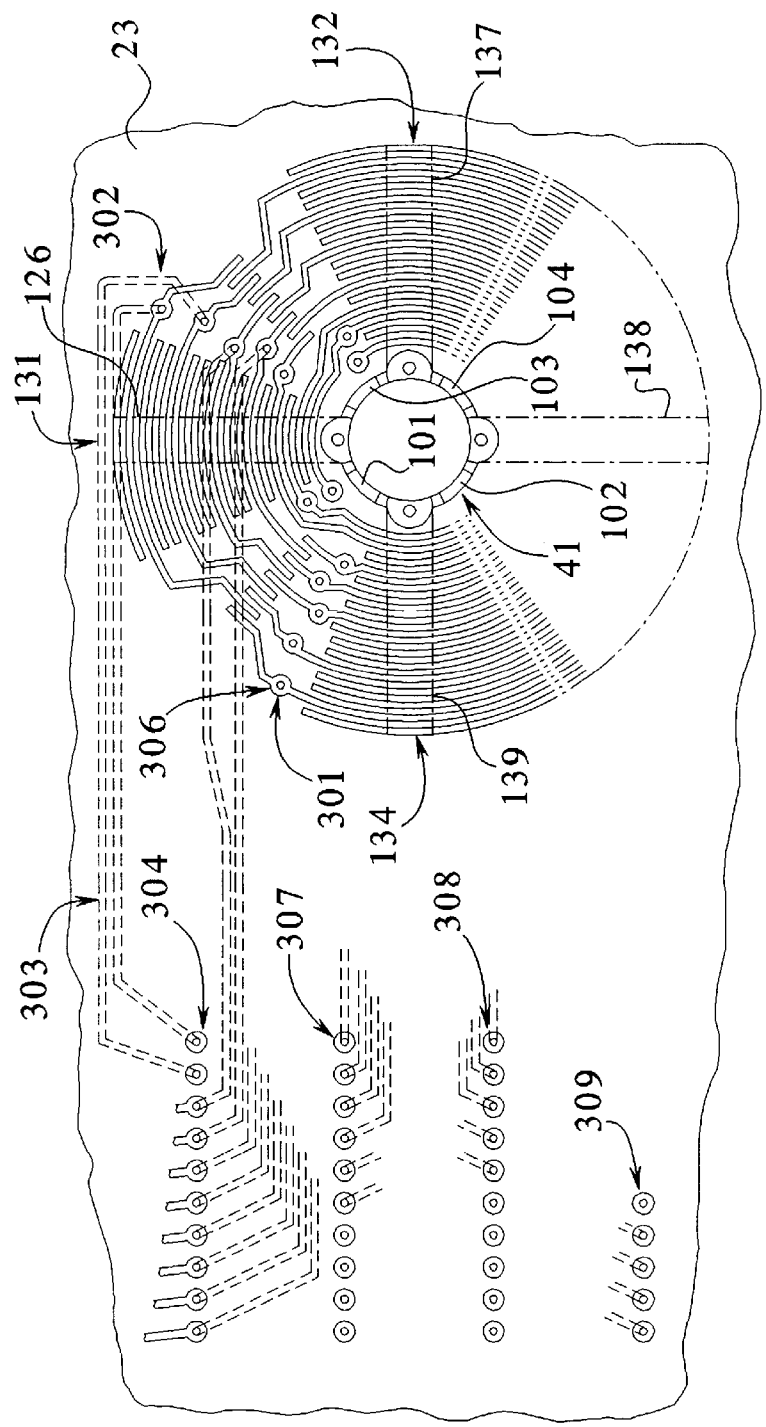
FIG.11
FIG.12
FIG.13

JOYSTICK POINTING DEVICE

BACKGROUND OF THE INVENTION

This application is a continuation-in-part of U.S. patent application Ser. No. 08/944,282 filed Oct. 6, 1997 now issued as U.S. Pat. No. 5,949,325 which is a continuation-in-part application of U.S. patent application Ser. No. 08/496,433, filed Jun. 29, 1995, now issued as U.S. Pat. No. 5,675,309.

The present invention generally relates to joystick pointing devices and in particular to an improved pointing device.

Joysticks are generally known in the art such as shown by U.S. Pat. Nos. 5,317,301 and 5,087,904.

Known joysticks, however, have several limitations that prevent automated mass production thereof. An improved joystick, such as disclosed by the application, reduces the assembly into an automated fashion rather than a human art. In prior devices, a collar goes into a printed circuit board that allows true alignment of the printed circuit board with a spring. A radiused inside edge of the collar prevents the spring from catching when the stick is deflected. The spring tension is, therefore, hard to maintain and is manually adjusted. A ramp also allows for manual as well as automated assembly. By making the collar electrically conductive, the need to solder the spring into the printed circuit board is eliminated.

SUMMARY OF THE INVENTION

In an embodiment of the present invention, a pointing device is provided. The device comprises: a collar that inserts into a printed circuit board. A spring extends through the collar wherein the spring is held in place by the collar on one side of the collar. A cap on an opposite side of the spring holds the spring in place. A conductive elastomer disc is biased to center by the spring wherein the printed circuit board has resistors and conductors on the board wherein the resistors and conductors make contact when the conductive elastomer disc is deflected.

In an embodiment, a radiused internal hole is provided on the collar.

In an embodiment, a ramp is provided on a side of the collar. A spring tab may be provided at an end of the ramp.

In an embodiment, a ramp is provided on a bottom side of the collar. A spring tab may be provided at an end of the ramp.

In an embodiment, the disc is electrically conductive.

In another embodiment of the present invention, a pointing device has a ribbed locking extension protruding through a printed circuit board. A conductive elastomer disc is attached to a ribbed locking extension wherein the conductive elastomer disc is biased to center due to the ribbed locking extension wherein the printed circuit board has resistors and conductors on the board wherein the resistors and conductors make contact when the conductive elastomer disc is deflected.

In an embodiment, a metal pin in a center of the ribbed locking extension is provided.

In an embodiment, a metal pin is provided that protrudes through the ribbed locking extension.

It is, therefore, an advantage of the present invention to provide an improved joystick device that has reduced component cost, decreased labor costs for assembly thereof, as well as allowing fully automated assembly.

These and other advantages of the present invention are described in, and will be apparent from, the detailed description of the presently preferred embodiments and from the drawings.

BRIEF DESCRIPTION OF THE DRAWINGS

FIG. 4 is a sectional view illustrating an embodiment of a modification of the invention;

FIG. 5 illustrates an embodiment of an embodiment of a modification of the present invention.

FIG. 6 is a plan view of a circuit board having resistors and conductive paths thereon.

FIG. 7 illustrates an embodiment of a modified form of the circuit board of the present invention.

FIG. 11 is a plan view of an embodiment of the center contacts of the present invention.

FIG. 12 illustrates an embodiment of a modification of the center contacts of the present invention.

FIG. 13 is a detailed view of an embodiment of the electrical paths on the printed circuit board of the present invention.

DETAILED DESCRIPTION OF THE PRESENTLY PREFERRED EMBODIMENTS

Figure 1:
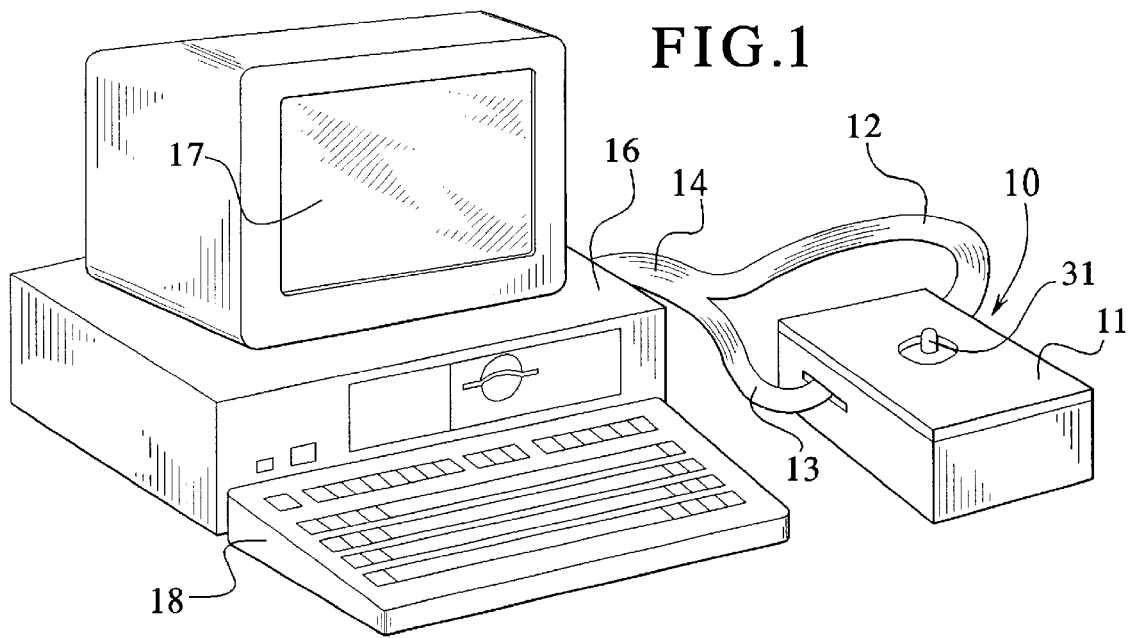
FIG. 1 is a perspective view illustrating an embodiment of the present invention connected to a computer.

The present invention relates to a joystick pad pointing device which uses a board such as a printed circuit board, glass, paper, ceramic or plastics which have conductive lines and resistive coatings formed on it or embedded or otherwise provided on the surface. The board has a hole that can be plated on its inner surface and separated with a laser, or by drilling or routing. A spring fits through the hole at a 90° angle and normally the spring does not make electrical contact with the board when external forces are absent. The spring or a sheath around the spring is electrically conductive, and the spring or sheath is biased with a voltage. When the spring or sheath is deflected by a user, it bends and makes electrical contact with the conductor within the hole. The board has electrical contacts (digital) that are closed when an external force is applied. Signals so developed are supplied to a micro controller either or both to wake up the micro-controller and tell it the direction plus speed. Because a digital contact is used, there is not a long analog to digital conversion time. The equation is (1.1)×(resistance maximum)×(Capacitance)=maximum conversion time, which is needed by analog only joysticks or pointing devices.

In the absence of the conversion delay time by using only digital input leads allows rapid movement, which makes the present joystick very quick to respond to the user's initial movements of the stick. The speed is determined and only limited by the speed of the micro-controller wake up routine plus the time to send the message to the receiver. Once there is movement caused by the closure, the micro-controller then looks at the analog portion of the signal to determine how much faster to move. If the user releases the force and allows the stick to move back to the neutral position, the firmware can interpret this as a MACRO function. For example, this function can mean TAB, move to next icon, move by page or it can be the same step as normal without using macros.

Upon further prolonged force/deflection, a contact is made or increased via the force diverter that causes contact on the analog/digital signal speed/direction interpreter. The micro-controller then converts this data with the earlier contact and determines various speeds and directions resulting in multiple speeds and multiple directions which are possible. The direction possibilities are at least two to infinite and speeds may be at least two to infinite. The larger the displacement of the diverter, the further out the contact is made with the analog/digital circuitry, thereby causing a variable signal which is due to the angular displacement of the spring/stick.

Upon release of all the external forces by the user by letting go of the spring (stick), it moves back to its normally biased position which does not make contact with the initial digital contacts, and the force diverter that is attached to the spring also moves back to the initial state. In its initial state, the force diverter can be making contact on the digital analog output section or can also not be making contact. If the force diverter is making contact in the neutral state, the micro-controller ignores this information by zeroing out this condition. The force diverter can be electrically active conductive or can be a pressure transfer point causing a variable closure on a membrane switch. The corresponding increase in force on the force diverter either increases the surface area of contact for change in resistance or it changes the absolute point of contact on the analog/digital contact thereby changing the point of the voltage potential. This changes the analog voltage. Software in the micro-controller interprets such data and sends an output to a relevant receiver which can be connected by a wire or otherwise connected.

Another novel feature of the pointing device is the "fan out" method that the circuit path traces from the resistor, thus, allowing the interleaving of the various traces for different speeds at different angles of displacement.

FIG. 1 is a perspective view illustrating the novel joystick/pressure pad of the invention mounted in a container 10 which has a top surface 11. Cables 12 and 13 extend from the container 10 and join in a cable 14 that is connected to a micro-controller 16 that is associated with a monitor 17 and a keyboard 18.

Figure 2:
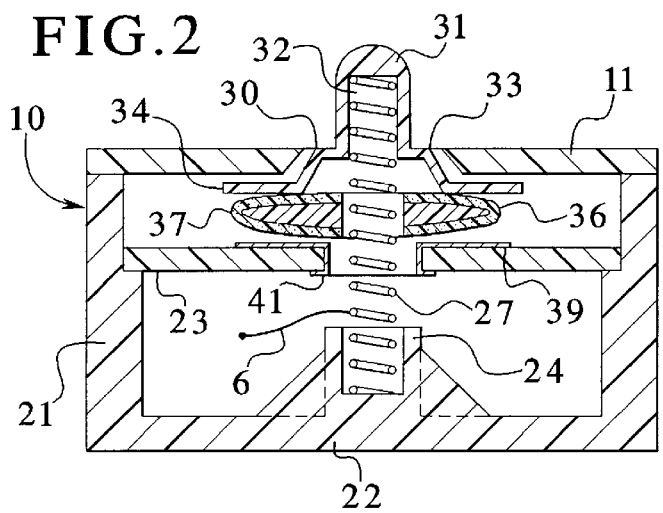
FIG. 2 is a sectional view illustrating an embodiment of the present invention.

FIG. 2 is a sectional view of the joystick of the invention wherein the container 10 has a bottom wall 22 and side walls 21 and a top wall 11 formed with an opening 30. A spring 27 is mounted in a boss 24 formed in the bottom wall 22 and extends upwardly through an opening in a printed circuit board 23 mounted in the container 10 and which has electrical conductive paths 41 and 39 formed on the inner surface of the opening and the printed circuit board 23. A force diverter 36 is mounted on the spring 27 and at least the outer surface is electrically conductive. It may be made, for example, of low durometer rubber and has a lower conductive surface which can engage printed circuit paths 39 on the printed circuit board 23 when the spring 27 is deflected from its center position. The spring 27 extends through the opening 30 in the top surface 11, and a stick 31 has an opening 32 in which the spring is received. The stick 31 has a downwardly extending generally conical portion 33 which joins an outer flat portion 34 that engages the force diverter 36. When the stick 31 is moved, it causes the spring 27 to be deflected so it engages the surface of the conductors 41 formed in the opening in the printed circuit board 23 and also causes the force diverter 36 to engage the printed circuit paths 39 on the printed circuit board 23. The container 10 may be made of non-conductive material and an electrical voltage is applied to the spring 27 by a conductor 6 so as to provide an energizing voltage.

Figure 3:
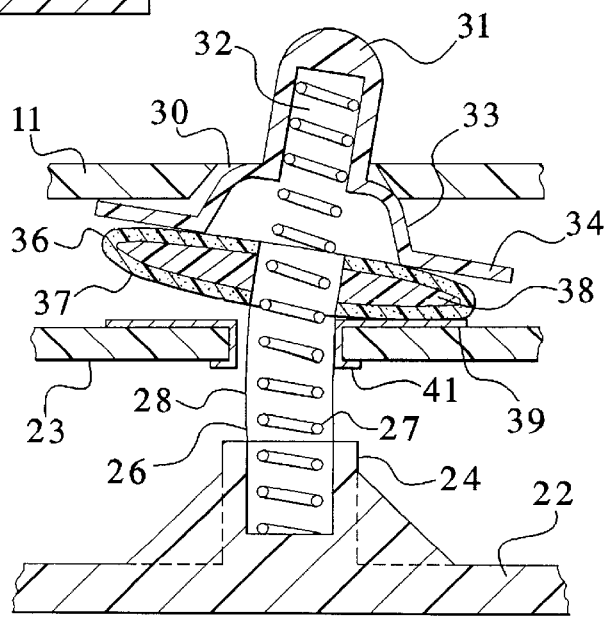
FIG. 3 is a sectional view illustrating an embodiment of the present invention.

FIG. 3 illustrates the joystick 31 in a deflected from neutral position wherein the outer conductive surface 37 of the force diverter 36 engages the printed circuit conductors 39, and a sheath 28 which is electrically connected to the spring 27 makes electrical contact with one of the conductors 41 in the opening in the printed circuit board 23. The center of the force diverter 36 may be hollow or filled with a suitable filler such as plastic 38.

FIG. 4 illustrates a slightly modified form of the invention wherein the spring 47 has a first end 48 that is mounted by a sleeve 49 in a bottom plate 46 of the container 10, and the upper end of the spring 47 is received in the hollow insides 92 of a stick 51 which attaches to a bottom plate 53 which engages the force diverter 54. The spring 47 fits in the opening 92 in the stick 51. By moving the stick 51, the force diverter engages the conductive paths 39 on the printed circuit board 23, and the spring 47 engages the conductive paths 41 on the inside of the opening in the printed circuit board 23.

FIG. 5 illustrates a further modification of the invention wherein the force diverter 61 may be made of a flexible substance such as low durometer rubber and has a portion which extends through an opening in the printed circuit board 23 and terminates in an enlarged portion 62. A stick 63 extends through the opening 30 in the top cover 11 and has a lower flat portion 64 which engages the force diverter 61 to move it to engage the circuit paths 39 on the printed circuit board 23.

FIG. 6 illustrates in plan view the circuit board 23 and includes a first plurality of parallel conductors 121a through 121f mounted on a first segment portion of the board 23. A resistive path 126 extends at right angles to the conductors 121 and makes electrical contact therewith. A second plurality of electrical conductors 122a–122f is formed in another segment of the printed circuit board 123a through 123f, and a resistive path 127 extends at right angles to the conductors 122a through 122f and makes electrical contact therewith. A third plurality of conductors 123a through 123f is also mounted on the circuit board 23 in a different segment and are electrically connected to a resistive path 128 which extends at right angles thereto. A fourth plurality of conductors 124a through 124f are mounted on another segment of the board 23 and are connected to a resistive path 129 which extends at right angles thereto. The spring 47, when deflected, engages the conductors 41 on the inside of the opening, and the force diverter 54 engages the printed circuit board 23.

FIG. 7 illustrates another arrangement of the printed circuit board 23 wherein a first plurality of printed circuit paths in the form of segments of a circle 131a–131i are formed in a first segment and are traversed by a resistive path 136. A second plurality of curved segments 132a–132i are formed on the printed circuit board 23 and are traversed by a resistive path 137. A third plurality of curved segments conducted paths 133a–133i are formed on the board 23 and are traversed by a resistive path 138. A fourth plurality of curved segments 134a–134i are mounted on another segment of the printed circuit board 23 and are traversed by a resistive path 139. The opening through the printed circuit board 23 is formed with four separate conductive paths 101, 102, 103 and 104 which are separated from each other as shown.

Figure 8:
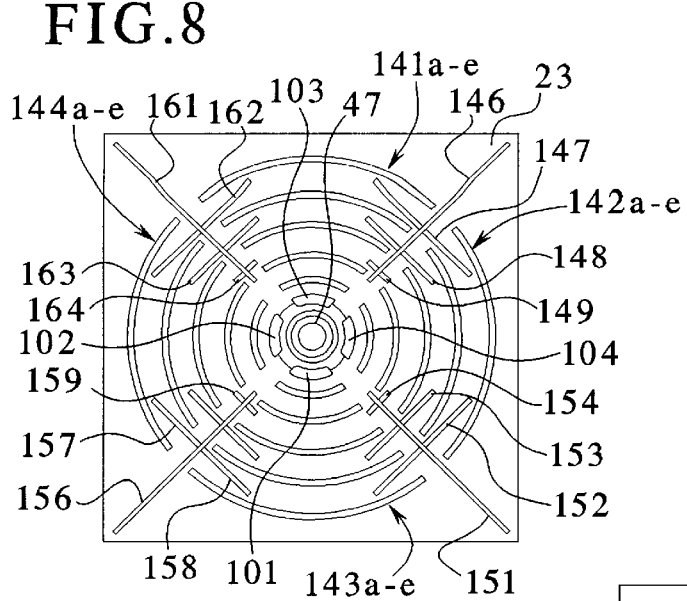
FIG. 8 illustrates an embodiment of a modified form of the circuit board of the present invention.

FIG. 8 is a modification of the circuit board 23 of FIG. 7 wherein a radially extending printed circuit path 146 is mounted in the space between a first plurality of curved segments 141a–141e and a second plurality of curved segments 142a–142e. Circuit paths 147, 148 and 149 extend from the radial circuit path 146 between the curved segments 141 and 142 as shown.

Other radial circuit paths 151, 156 and 161 extend through the gaps between the curved conductive paths 142a–3 and 144a–3 as shown. Radial circuit path 151 has transverse extending conductive paths 152, 153 and 154 as shown. Radial circuit path 156 has transverse extending circuit paths 157, 158 and 159 as shown. Radial circuit path 161 has extending transverse circuit paths 162, 163 and 164 as shown. The spring 47 is engageable with the conductive segments 101, 102, 103 and 104 when deflected.

Figure 9:
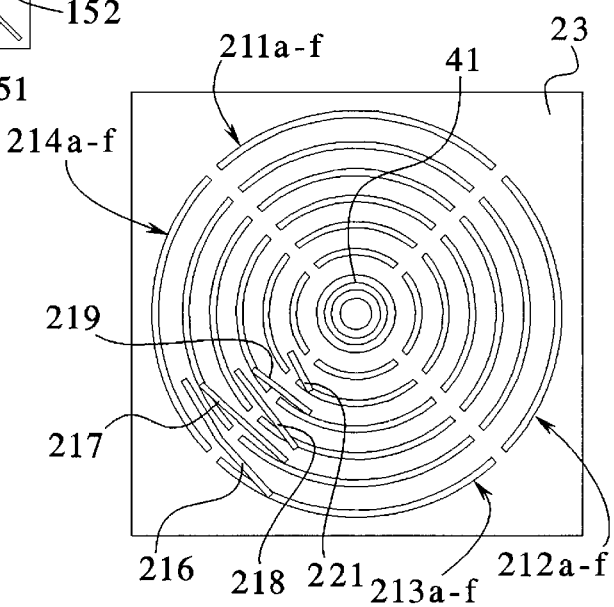
FIG. 9 illustrates an embodiment of a modified form of the circuit board of the present invention.

FIG. 9 shows another modification of the invention wherein circuit paths 216, 217, 218 and 219 are interwoven between the curved circuit paths such as 213a–213f and 214a–214f and extend at angles which are not perpendicular to radials so as to increase the quantity of speeds that are available in diagonals. It is to be realized, of course, that the interwoven fingers such as 216–219 may also be formed between the segments 212a–212f and 213a–213f as well as between the segments 211a–211f and 212a–212f and also between the segments 211a–211f and 214a–214f.

Figure 10:
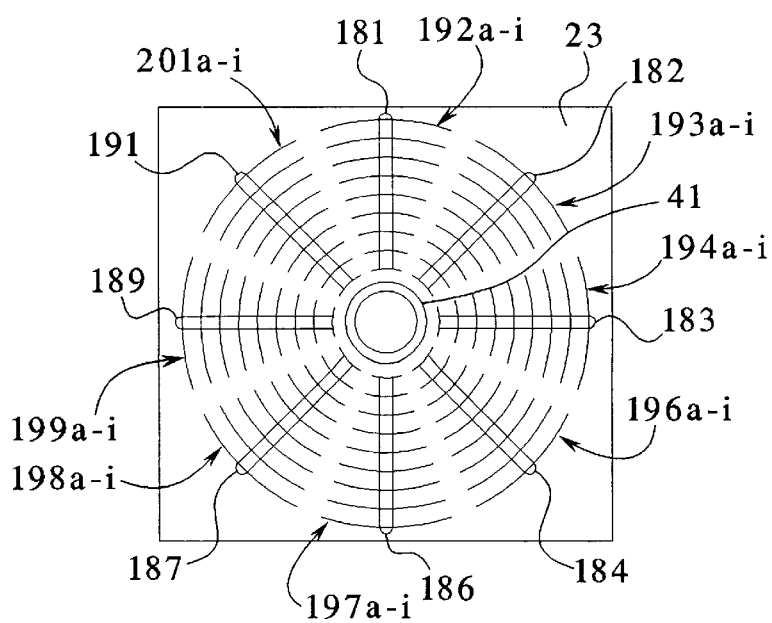
FIG. 10 illustrates an embodiment of a modified form of the circuit board of the present invention.

FIG. 10 illustrates a printed circuit board 23 which is formed with additional separated curved segments so as to increase the angular resolution of the device. First parallel curved segments 192a–192i are traversed by a resistive path 181. Second segments 193a–193i are traversed by a resistive path 182. A third plurality of segments 194a–194i are traversed by a resistive path 183. A fourth plurality of segments 196a–196i are traversed by a resistive path 184. A fifth plurality of radial segments 197a–197i are traversed by a resistive path 186. A sixth plurality of radial segments 198a–198i is traversed by a resistive path 187. A seventh plurality of conductive paths 199a–199i is traversed by a resistive path 189, and an eighth plurality of conductive paths 201a–201i is traversed by resistive path 191 as shown. This increases the angular resolution of the device by a factor of two over the board shown in FIGS. 6 and 7 for example.

FIG. 13 illustrates in detail the manner of connecting the various electrical conductive paths to an external circuit. The conductive portions 101, 102 and 103 and 104 formed in the opening of the printed circuit board 23 are connected to terminals as shown which are then connected by conductive paths to terminals such as 309. The curved segments 131 are each connected to different terminals and are connected by leads such as 302 and 303 to different terminals 304. Other segments are each connected to different terminals such as 306 which are connected to different remote terminals 304 by the conductive path 5.

Thus, the present invention provides a novel joystick which allows many different orientations to be recognized and sent to a control device, as well as allows the amount of deflection of the joystick or pressure pad to be detected, so as to provide a control signal.

Figure 14:
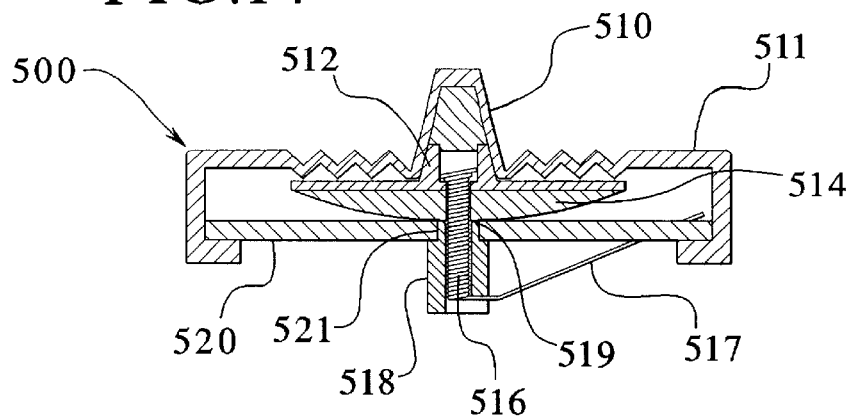
FIG. 14 illustrates a cross-sectional view of an embodiment of the present invention including a collar piece.

Referring now to the embodiments illustrated in FIGS. 14–19, wherein like numerals refer to like parts, FIG. 14 generally illustrates a module unit 500 having several parts. A stick 510 is encapsulated by an elastomer return container 511 that encapsulates a surface of the module unit 500. The elastomer return container 511 covers a two-piece rigid cap 512 which covers a conductive elastomer disc 514. The two-piece rigid cap 512 confines one side of a spring 516. The spring 516 has a spring extension tab 517 held by a collar 518. The collar 518 has a radiused internal hole 519. A printed circuit board 520 has a center hole 521; the collar 518 rests in the center hole 521 of the printed circuit board 521 with the spring 516 in the center of the collar 518.

Figure 15:
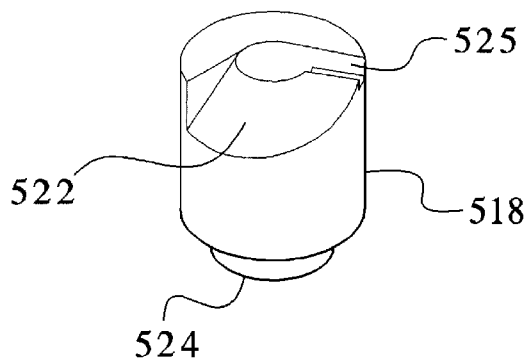
FIG. 15 illustrates a perspective view of an embodiment of a collar piece of the present invention.

When the module unit 500 in FIG. 14 has no force applied thereto, the stick 510 is in a static position. A tension force that is exerted by the spring 516 and a tension force exerted by the elastomer return container 511 keeps the stick 510 in a position whereby the conductive elastomer disc 514 does not come in contact with the printed circuit board 520. The conductive elastomer disc 514 rests only on the top surface of the radiused internal hole 519 of the collar 518. The two-piece rigid cap 512 locks a top end of the spring 516; and the collar 518 is locked into the bottom of the center hole 521 of the printed circuit board 520. The spring extension tab 517 is locked into the printed circuit board 520. The collar 518 has a ramp 522 (as illustrated in FIG. 15) that allows for spinning or rotation of the collar 518 so that the spring 516 is pre-loaded with tension, and the extension tab 517 of the spring 516 falls into a spring slot 525 of the collar 518 (also shown in FIG. 15). This action determines a fixed minimum continuous pre-loaded tension force between the two-piece rigid cap 512 and the collar 518.

As a force is applied in a perpendicular fashion to the stick 510, the resulting force is transferred to the elastomer return container 511 to the two-piece rigid cap 512, and the conductive elastomer disc 514 causes the spring 516 to bend. This, in turn, allows the conductive elastomer disc 514 to rotate onto the printed circuit board 520 which has resistors 528 and conductors 530a–530f that radiate outward therefrom (see FIG. 16). As the force applied to the stick 510 increases, the spring 516 bends such that it stretches across the radiused internal hole 519 of the collar 518.

As the conductive elastomer disc 514 further rotates out, the conductive elastomer disc 514 causes a change in the electrical resistance on the printed circuit board 520 that may correspond to direction and/or speed. The collar 518 is conductive and makes contact on the conductive part of the printed circuit board 520 as well as the conductive spring 516. The conductive spring 516 provides conductivity with the conductive elastomer disc 514 whereby there is a completed electrical path. As previously mentioned with respect to FIG. 15, the collar 518 has a ramp 522 that has a recess on the top 524 and a spring slot 525.

As shown in FIG. 15, the collar 518 may also be conductive with the ramp 522 leading into the spring slot 525. The purpose of the ramp 522 is to pre-load the spring 516 in a constant static position. The spring extension tab 517 is in a fixed position, and the collar 518 is rotated so that the spring 516 is expanded whereby the spring extension tab 517 falls into the spring slot 525 on the collar 518. The other end of the collar 518 has a recess on the top 524 to fit and lock into the printed circuit board 520.

Figure 16:
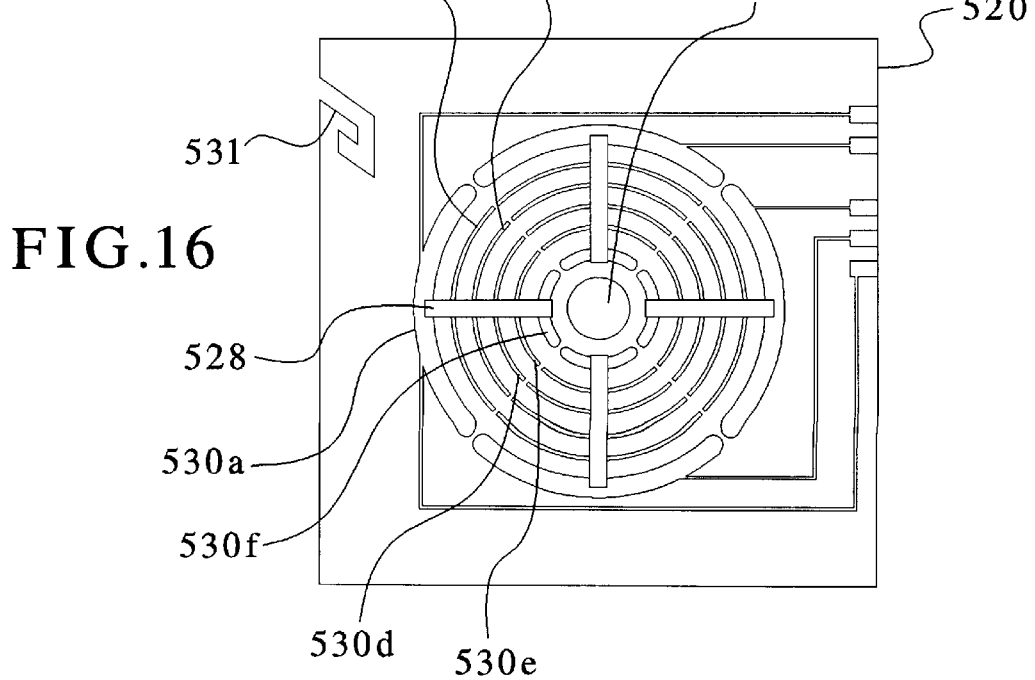
FIG. 16 illustrates a plan view of an embodiment of a printed circuit board through which the collar piece of the present invention is inserted.

Referring now to FIG. 16, the printed circuit board 520 has resistors 528 and conductors 530a–530f. Also provided is a spring tab lock 531. As illustrated in FIG. 16, the printed circuit board 520 with the resistors 528 are placed across the conductors 503a–530f to make a continuous electrical path on a surface of the printed circuit board 520 with a resistance drop depending where the conductive elastomer disc 514 makes contact on the printed circuit board 520. In the center of the printed circuit board 520 is a center hole 521 wherein the recess on the collar 518 on its top 524 press fits to make a rigid fixed support. A spring tab lock 531 locks the spring extension tab 517 in place.

Figure 17:
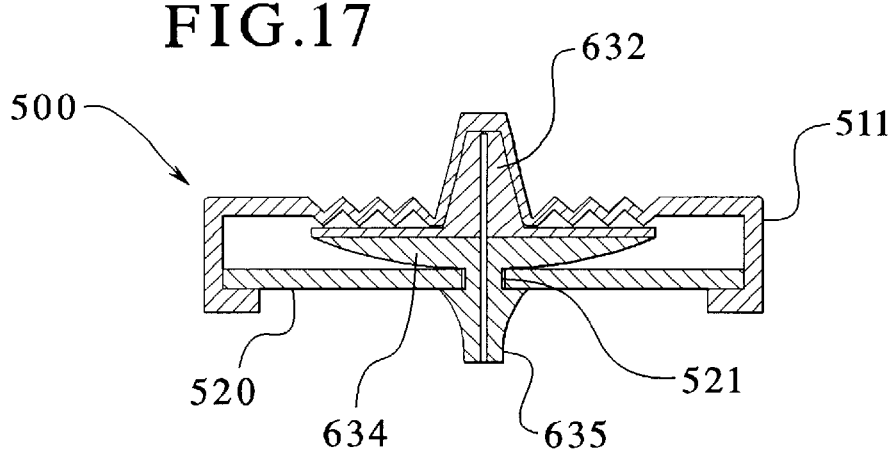
FIG. 17 illustrates a cross-sectional view of another embodiment of a collarless ribbed module.
Figure 18:
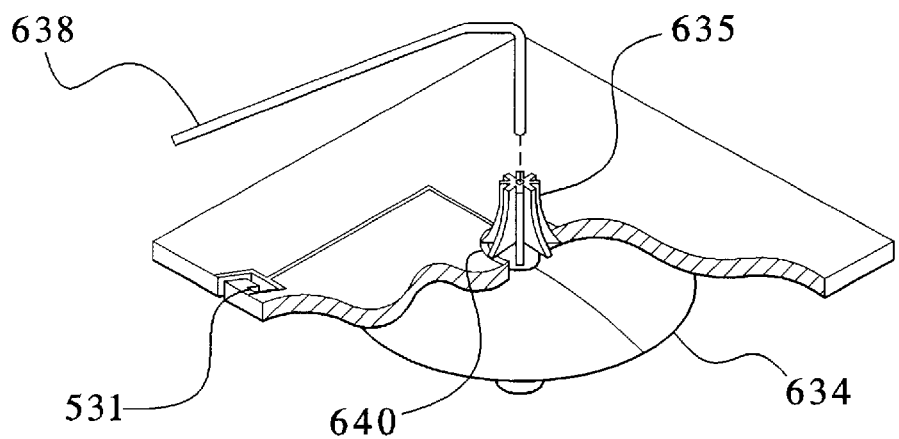
FIG. 18 illustrates a perspective view partially in cross-section of an embodiment of the collarless ribbed module with metal retaining pin.
Figure 19:
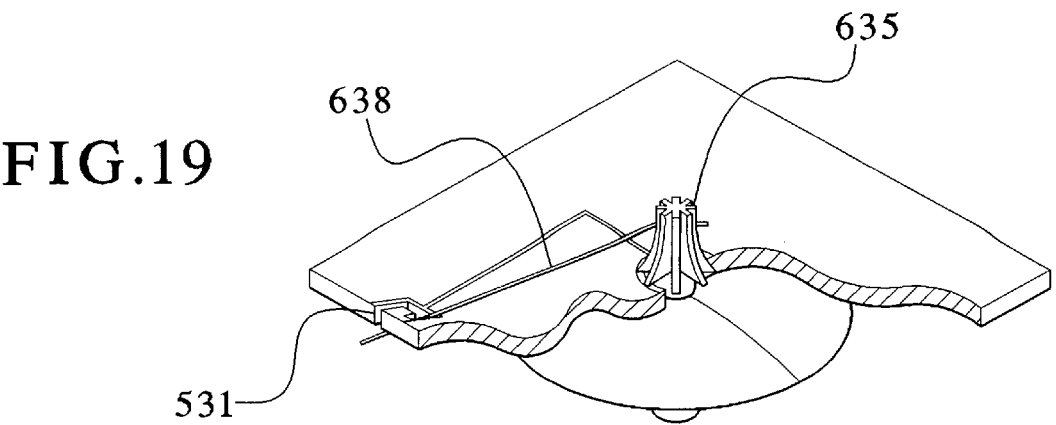
FIG. 19 illustrates another perspective view of an embodiment of the metal retaining pin arranged to extend through the ribs and lock into the printed circuit board.

Referring now to FIGS. 17–19, particularly FIG. 17, the module 500 consists of the elastomer return container 511 that covers a one-piece rigid cap 632. The one-piece rigid cap 632 covers a collarless, ribbed, curved disc 634. The collarless, ribbed, curved disc 634 is fitted through the center hole 521 of the printed circuit board 520. The ribbed locking extension 635 is provided on the bottom of the collarless, ribbed, curved disc 634.

As shown in FIG. 17, the elastomer return container 511 covers the one-piece rigid cap 632 that is on top of the collarless, ribbed, curved disc 634 in the neutral position whereby the ribbed locking extension 635 provides the locking, pivoting, and electrical connection to the collarless, ribbed, curved disc 634. The collarless, ribbed, curved disc 634 has the ribbed locking extension 635 that is inserted into the center hole 521 of the printed circuit board 520. As the surface of the collarless, ribbed, curved disc 634 is deflected, the ribbed locking extension 635 provides tension to return the collarless, ribbed, curved disc 634 back to a neutral position.

As shown, the ribbed locking extension 635 is preferably ribbed as opposed to being solid. The ribbing is provided such that the extension 635 can be pulled through the center hole 521 of the printed circuit board 520 and have a larger radiating footprint to allow for greater external forces to be applied without the ribbed locking extension 635 being pulled out therefrom. When a force is applied to the elastomer return container 511, it is transferred to the one-piece rigid cap 632 whereby a force is transferred to the collarless, ribbed, curved disc 634 resulting in a pivoting action on the printed circuit board 520 wherein the collarless, ribbed, curved disc 634 makes electrical contact away from the center hole 521 of the printed circuit board 520 with the surface of the printed circuit board 520. The printed circuit board 520 has resistors 528 and conductors 530a–530f that make contact with the collarless, ribbed, curved disc 634 causing a variable resistance that may be interpolated into speed and/or position data.

Referring now to FIG. 18, a conductive trace 640 is illustrated that provides electrical connection to the collarless, ribbed, curved disc 634 via the ribbed locking extension 635. A metal pin 638 is inserted into a center of the ribbed locking extension 635 and the spring tab lock 531. The conductive trace 640 that makes electrical and mechanical connection to the collarless, ribbed locking extension 634 via the ribbed locking extension 635 is generally illustrated in FIG. 18. Furthermore, a metal pin 638 can be inserted into the bottom of the center of the ribbed locking extension 635 to provide electrical contact as well as rigid support of the collarless, ribbed, curved disc 634.

As illustrated in FIG. 19, the metal pin 638 is inserted into the ribbed locking extension 635 and locked into the spring tab lock 531. The metal pin 638 is shown in FIG. 19 through the bottom of the ribbed locking extension 635 for electrical connection and locked into the spring tab lock 531.

As illustrated by the embodiment shown in FIGS. 14–19, mass production of the module unit 500 can be provided as well as manufactured for less cost using automated assembly. In addition, the performance of the module unit is enhanced from the features added as shown and described with reference to FIGS. 14–19.

It should be understood, however, that FIGS. 14–19 merely provide an illustration of preferred embodiments of the present invention. Of course, other embodiments are possible within its scope. For example, the ribs may be of various configurations. In addition, the number of ribs may vary, for example, from three to three-hundred. Likewise, the collar may have several shapes, such as square or oblong.

Figure 20:
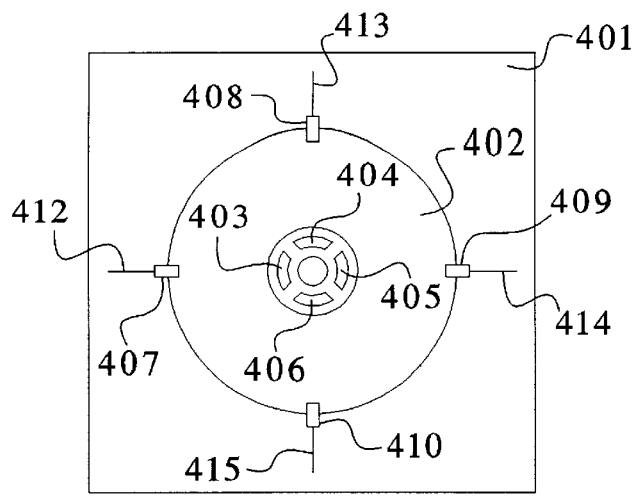
FIG. 20 illustrates a modified form of the invention.
Figure 21:
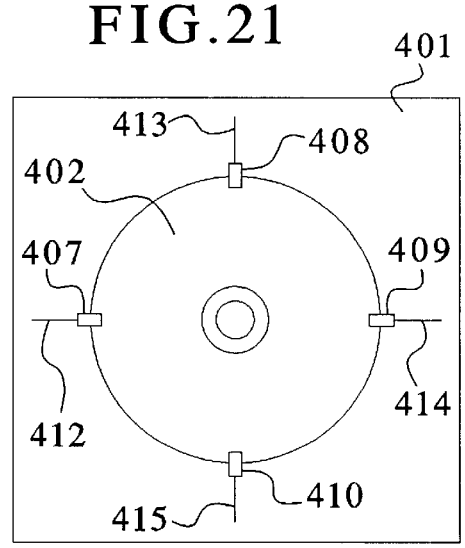
FIG. 21 shows the resistive coating of the device of FIG. 20.
Figure 22:
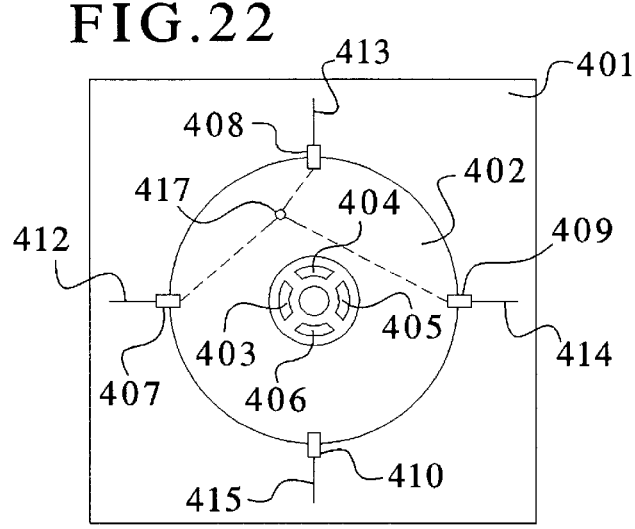
FIG. 22 illustrates the point of triangulation of the device of FIG. 20.

FIGS. 20, 21 and 22 illustrate a modification which includes a substrate 401 upon which is formed an annular shaped resistive material layer 402.

Conductive pads 407, 408, 409 and 410 contact the outer edges of the layer 402 as shown. Electrical leads 412, 413, 414 and 115 are respectively connected to conductive pads 407, 408, 409 and 410 as shown.

Digital input conductive traces 403, 404, 405 and 406 are formed on substrate 401 within the annular shaped resistive material layer 402.

Figure 23:
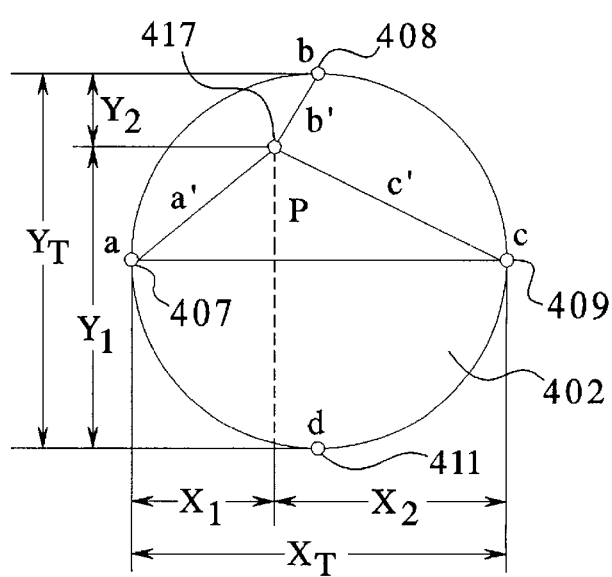
FIG. 23 illustrates the theory of triangulation for the device of FIG. 20.

When deflected, the force diverter, not shown in FIGS. 20, 21 and 22 engages the resistive layer 401 at point (P) 417, for example, as shown in FIGS. 22 and 23.

The resistive value at point P can be found as shown in FIG. 23 in the following manner. To find the co-ordinate of point P, the shortest distance from a, b, c, and d using the analog conversion is found. Once this is completed, the three closest points are triangulated therebetween with respect to their polar position. One example is as shown whereby point P is closest to point b in the upper left quadrant.

Our knowns are:
$Y_T$=Constant
$X_T$=Constant
$y_1+y_2=Y_T$
$x_1+x_2=X_T$ $$\sqrt{(x_1)^2 + (y_1 - 0.5Y_T)^{2'}} = a'$$

$$\sqrt{(y_2)^2 + (0.5X_T - x_1)^{2'}} = b'$$

$$\sqrt{(x_2)^2 + (y_1 - .5Y_T)^{2'}} = c'$$

Thus, the voltage at contact point P can be determined relative to the contacts 407, 408, 409 and 410, and from these values, the position of point P can be determined.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A joystick pointing device comprising:

a substrate formed with a hole defined by a fixed pivoting area wherein a surface of said substrate is coated with an electrically conductive material forming a resistive area surrounding said hole over the surface of the substrate;

electrically conductive pads attached to the electrically conductive material;

an electrically conductive force disc that makes electrical contact on said substrate at various positions; and a pivoting mechanism having a flexible pivoting portion extending through said hole of said substrate wherein said force disc is attached to said pivoting mechanism above said pivoting area and further wherein said pivoting mechanism has an undeflected position and is movable to a deflected position by flexibly pivoting about said pivoting area producing an output signal transmittable through the electrically conductive pads wherein said pivoting mechanism causes said force disc to change electrical contact position with said electrically conductive material on said surface of said substrate to cause a corresponding change in the output signal when said electrically conductive force disc changes electrical contact position.

* * * * *